United States Patent
Molinelli et al.

(10) Patent No.: US 11,971,072 B2
(45) Date of Patent: Apr. 30, 2024

(54) BEARING ASSEMBLY

(71) Applicant: Microtecnica S.r.l., Turin (IT)

(72) Inventors: Dario Molinelli, Carnate (IT); Franco Maino, Brugherio (IT); Michele Restuccia, Milan (IT)

(73) Assignee: MICROTECNICA S.R.L., Turin (IT)

( * ) Notice: Subject to any disclaimer, the term of this patent is extended or adjusted under 35 U.S.C. 154(b) by 0 days.

(21) Appl. No.: 17/735,504

(22) Filed: May 3, 2022

(65) Prior Publication Data

US 2022/0373024 A1  Nov. 24, 2022

(30) Foreign Application Priority Data

May 18, 2021 (EP) .................................. 21174541

(51) Int. Cl.
*F16C 23/04* (2006.01)
*F16C 43/02* (2006.01)

(52) U.S. Cl.
CPC .......... *F16C 43/02* (2013.01); *F16C 23/046* (2013.01)

(58) Field of Classification Search
CPC ............ F16C 11/0614; F16C 11/0647; F16C 23/043; F16C 23/045; F16C 23/046; F16C 25/02; F16C 35/02; F16C 43/02; F16C 2326/43
See application file for complete search history.

(56) References Cited

U.S. PATENT DOCUMENTS

| | | | |
|---|---|---|---|
| 2,814,538 A * | 11/1957 | Connolly | F16C 11/0614 384/911 |
| 3,934,957 A | 1/1976 | Derner | |
| 4,780,000 A | 10/1988 | Lewis et al. | |
| 5,549,393 A | 8/1996 | Morando | |
| 5,718,517 A | 2/1998 | Morando | |
| 10,118,665 B2 | 11/2018 | Seidl | |

FOREIGN PATENT DOCUMENTS

JP  2002327737 A  11/2002

OTHER PUBLICATIONS

Abstract for JP2002327737 (A), published, Nov. 15, 2002, 1 page.
European Search Report for Application No. 21174541.9, dated Oct. 27, 2021, 8 pages.

* cited by examiner

*Primary Examiner* — James Pilkington
(74) *Attorney, Agent, or Firm* — CANTOR COLBURN LLP

(57) ABSTRACT

A bearing assembly includes a housing, a spherical bearing located within the housing, and two outer races positioned between the spherical bearing and the housing. The outer races are configured in sliding engagement with the spherical bearing to allow the spherical bearing to rotate relative to the housing. The assembly also includes a tightening element configured to engage a first of the two outer races and tighten the outer races against the spherical bearing. The assembly is configured to provide a primary load path from the tightening element to the housing, wherein the primary load path leads from the tightening element to the housing via the outer races whilst bypassing the spherical bearing.

10 Claims, 5 Drawing Sheets

BEARING ASSEMBLY

CROSS-REFERENCE TO RELATED APPLICATIONS

This application claims priority to European Patent Application No. 21174541.9 filed May 18, 2021, the entire contents of which is incorporated herein by reference.

TECHNICAL FIELD

The present disclosure relates to a bearing assembly, in particular for use in an actuator for a helicopter main rotor, although other applications are envisaged.

BACKGROUND

FIG. 1 illustrates a side view of a main rotor 2 of a helicopter. The main rotor 2 comprises four blades 4 each connected to a hub 6 which rotates about a central axis 8. The main rotor 2 also comprises an upper swash plate 10 and a lower swash plate 12, where the upper swash plate 10 rotates relative to the lower swash plate 12 via bearings. Multiple pitch links 16 attach each blade to the upper swash plate 10, where each pitch link 16 is hinged at its top and bottom. The main rotor 2 also comprises a plurality (for example three) of actuators 18 attached to the lower swash plate 12, and extension or retraction of the main rotor actuators 18 causes the lower swash plate 12 to be moved up or down (or tilted) relative to a helicopter main body 20, thereby allowing the pilot to steer the helicopter. The main rotor actuators 18 are pivotally attached to the lower swash plate 12 and are in the form of linear actuators. At the lower end of each of the main rotor actuators 18 is a bearing assembly 24, which permits angular rotation of the actuator 18 in two orthogonal directions.

It would be understood that the bearing assembly 24 of the present disclosure can be applied to any suitable type of helicopter, and to other locations within a helicopter. The bearing assembly described herein is also not limited to use in a helicopter and may be applicable to other systems, and is also not necessarily limited to use with linear actuators.

FIG. 2 illustrates a conventional bearing assembly 24 which may be used in the main rotor 2 of a helicopter (such as that illustrated in FIG. 1). The bearing assembly 24 comprises a spherical bearing 26 which is located around a lower shaft 28 of a main rotor actuator 18 as defined above.

The spherical bearing 26 comprises a cylindrical passage through its centre, through which the lower shaft 28 extends. The spherical bearing 26 is secured in place at one end by a shoulder 30 located on the lower shaft 28. An inner nut 27 is screwed onto a screw thread 46 of the lower shaft 28 in order to fix the spherical bearing 26 in place. Accordingly, the spherical bearing 26 is held between the shoulder 30 of the lower shaft 28 and the inner nut 27. This method of holding the spherical bearing 26 is not essential and any suitable method may be used.

The bearing assembly 24 comprises a static housing 32 that is fitted around the spherical bearing 26 and is configured to remain stationary as the lower shaft 28 and spherical bearing 26 move in use. The housing comprises a hollow interior within which the spherical bearing is located. Two outer races 34, 36 are located between the housing 32 and the spherical bearing 26. The outer races 34, 36 are generally annular and each have a curved inner surface 38, 40 that complements the curved outer surface 42 of the spherical bearing 26. In this manner the inner surface 38, 40 of each outer race is configured to slidingly contact the outer surface 42 of the spherical bearing 26 in use.

An outer nut 44 is configured to screw onto a thread 48 located on an inner cylindrical bore of the housing 32, and press against the right-hand outer race 34 (as illustrated in FIG. 2). The right-hand outer race 34 is wedged between the spherical bearing 26 and the housing 32. This means that, in turn, the outer nut 44 urges the spherical bearing 26 towards the left-hand outer race 36, which is itself wedged between the spherical bearing 26 and the housing 32. Accordingly, the outer nut 44 co-operates with the outer races 34, 36 to hold the spherical bearing 26 in place.

The outer nut 44 is hollow and such that the lower shaft 28 and inner nut 27 can extend through the outer nut 44 as illustrated.

More specifically, the outer nut 44 comprises a surface 52 configured to engage with an opposing surface 50 of the right-hand outer race 34. The right-hand outer race 34 further comprises a bearing surface 38 configured to engage the cooperating bearing surface 42 of the spherical bearing 26 and which is in sliding contact with the spherical bearing 26. The left-hand outer race 36 is configured to engage a shoulder 54 of the housing 32.

To bring the bearing assembly 24 to an operational state, the outer nut 44 is screwed into the housing 32. Once sufficiently tightened, the outer nut 44 contacts the right-hand outer race 34. When the outer nut 44 is tightened further, the right-hand outer race 34 will be pushed to the left (in the orientation in FIG. 2) by the outer nut 44 and against the bearing surface 42 of the spherical bearing 26 (due to the right-hand outer race 34 being wedged between the spherical bearing 26 and the housing 32). Thus, the right-hand outer race 34 urges the spherical bearing 26 towards the left-hand outer race 36. This, in turn, causes the spherical bearing 26 to urge the left-hand outer race 36 to the left as shown in FIG. 2, and against the shoulder 54 of the housing 32. Once each of the outer nut 44, the outer races 34, 36, the spherical bearing 26, and the housing 32 are tightened, any further tightening of the outer nut 44 will cause the friction between each component to increase. The arrow 96 in FIG. 2 illustrates the direction in which the load applied by the outer nut 44 travels through the components of the bearing assembly 24.

FIG. 3 shows two graphs, one on top of the other (for ease of illustration). The top graph illustrates a typical relationship between a 'break-away' torque of the spherical bearing 26 and a tightening torque of the outer nut 44, in respect of the arrangement of FIG. 2. As will be appreciated, as the outer nut 44 is tightened, the tightening torque of the outer nut 44 increases (the tightening torque being defined as a torque applied to tighten the outer nut 44).

Since the right-hand outer race 34 urges the spherical bearing 26 and left-hand outer race 36 towards the shoulder 54 of the housing 32, an increase in the tightening torque of the outer nut 44 increases the friction between the outer races 34, 36 and the spherical bearing 26.

The break-away torque is defined as a minimum torque required to cause the spherical bearing 26 to rotate, and is of course related to the friction between the spherical bearing 26 and the outer races 34, 36. Specifically, as the tightening torque increases, so does the break-away torque of the spherical bearing 26. This relationship is approximately linear as illustrated in the top graph of FIG. 3.

One drawback of the conventional arrangement is that in order to achieve a required break-away torque of the spherical bearing 26, a relatively low tightening torque of the outer ring 44 must typically be applied (see range 102 shown in FIG. 3). This is due to the above-described dependence of the breakaway torque of the spherical bearing 26 on the tightening torque. Additionally, the tightening torque must be within a relatively narrow range (as shown in FIG. 3) in order to achieve a break-away torque within an acceptable range. The acceptable tightening torque is, therefore, constrained by the required break-away torque and it is not possible to choose a higher tightening torque as indicated by the optimum operating range 104 shown in FIG. 3. This could be an optimum tightening torque according to a duty cycle or external loads of the system. Further issues arise due to the use of an inadequate tightening torque in the range 102 shown in FIG. 3 (otherwise known as clamping pre-load), in that the breakaway torque needs to be frequently checked and re-adjusted throughout service. Tightening the torque to the higher range 104 would avoid this, but then (as will be appreciated from FIG. 3) the break-away torque would be too high.

SUMMARY

In an aspect of the disclosure there is provided a bearing assembly. The assembly comprises a housing, a spherical bearing located within the housing, and two outer races positioned between the spherical bearing and the housing. The outer races are configured in sliding engagement with the spherical bearing to allow the spherical bearing to rotate relative to the housing. The assembly comprises a tightening element configured to engage a first of the two outer races and tighten the outer races against the spherical bearing, wherein the assembly is configured to provide a primary load path from the tightening element to the housing, wherein the primary load path leads from the tightening element to the housing via the outer races whilst bypassing the spherical bearing. This primary load path means that a lower force is exerted by the tightening element onto the spherical bearing via the outer races. Thus, the tightening element can be tightened, to achieve a high tightening torque, without excessively increasing the break-away torque of the spherical bearing.

The bearing assembly may comprise a shim between the first and second outer races, wherein the primary load path leads through the shim. The shim is easy to produce and maintain, and provides simple and effective means for providing the primary load path.

The shim may contact the first and second outer races to transfer load therebetween.

The first and second outer races and the shim may be positioned concentrically between the spherical bearing and the housing.

The tightening element may be configured to tighten so as to press the first outer race against the shim, which in turn presses the second outer race against a portion of the housing so as to provide the primary load path.

The shim may be an annular piece. This means that the force from the tightening element is distributed evenly about the circumference of the shim and may increase the working life of the shim.

The tightening element may be configured to tighten the outer races against the spherical bearing to provide a preload of the bearing assembly.

The tightening element may be a screw. A screw is easy to produce and is easily tightened to a desired tightening torque.

The housing may comprise a surface, optionally a shoulder, against which the second outer race is configured to abut in use.

The housing may comprise an inner cylindrical bore with a screw thread which engages with a screw thread of the tightening element.

The two outer races may have curved inner surfaces which complement an outer surface of the spherical bearing to permit a continuous sliding contact therebetween. This allows a tight fit between the spherical bearing and the two outer races, thus providing a robust bearing assembly which can withstand high external forces.

In an aspect of the disclosure there is provided a linear actuator comprising a bearing assembly as described above.

The linear actuator may further comprise a shaft that extends through and is configured to move with the spherical bearing.

In an aspect of the disclosure there is provided a maintenance method for a bearing assembly as described above. The method comprises defining an acceptable range of breakaway torque for the spherical bearing, and tightening the tightening member until the breakaway torque is within the acceptable range for the bearing assembly. The acceptable range of the breakaway torque can vary depending on the system which the bearing assembly is intended for. The skilled person would be able to determine the required acceptable range of breakaway torque by experimentation on the system at hand (and its intended use), or the required range may be a pre-set value.

DETAILED DESCRIPTION

Figure 1:
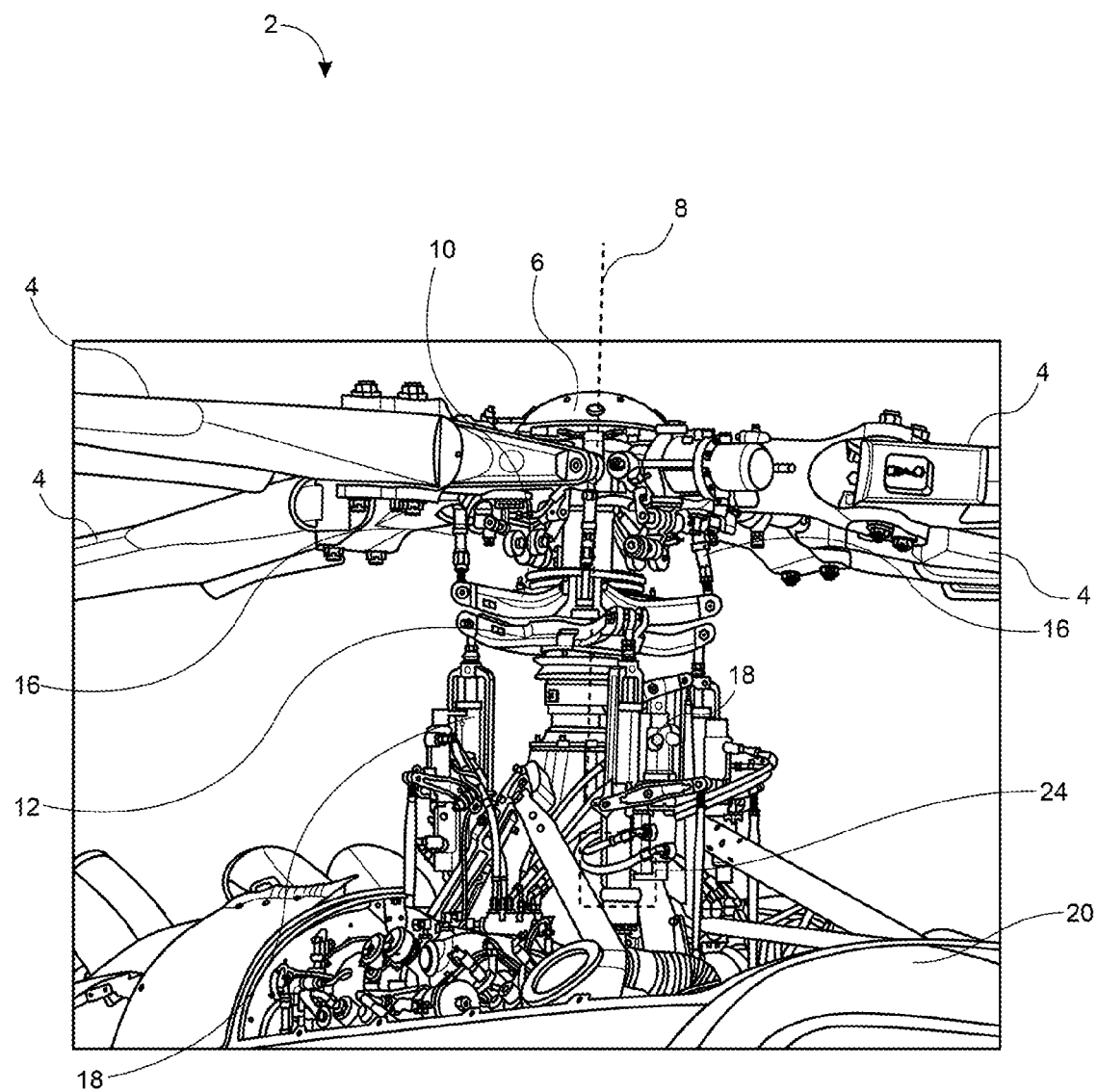
FIG. 1 shows a side view of a main rotor of a helicopter.
Figure 2:
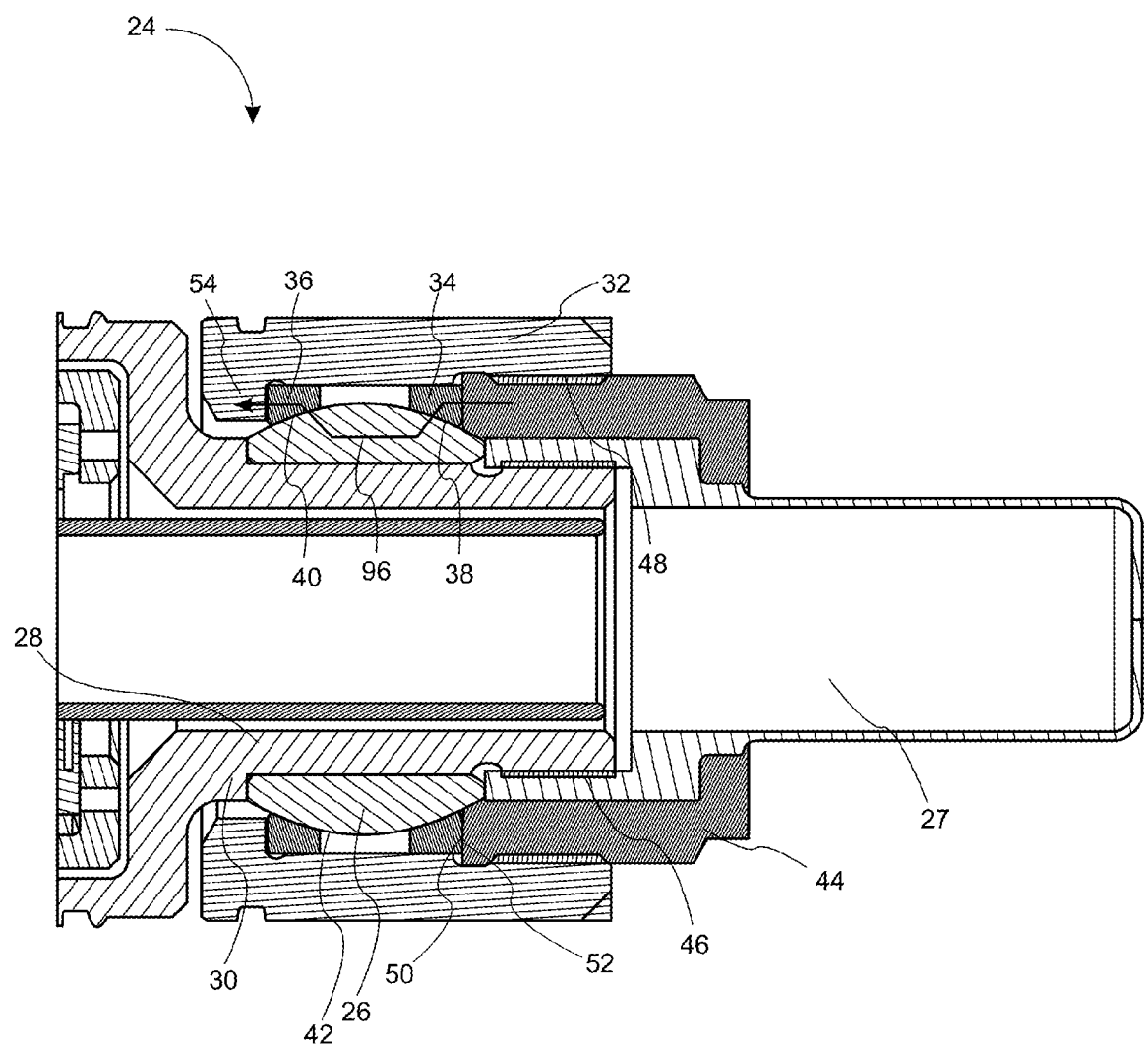
FIG. 2 shows a cross-section of a conventional bearing assembly.
Figure 3:
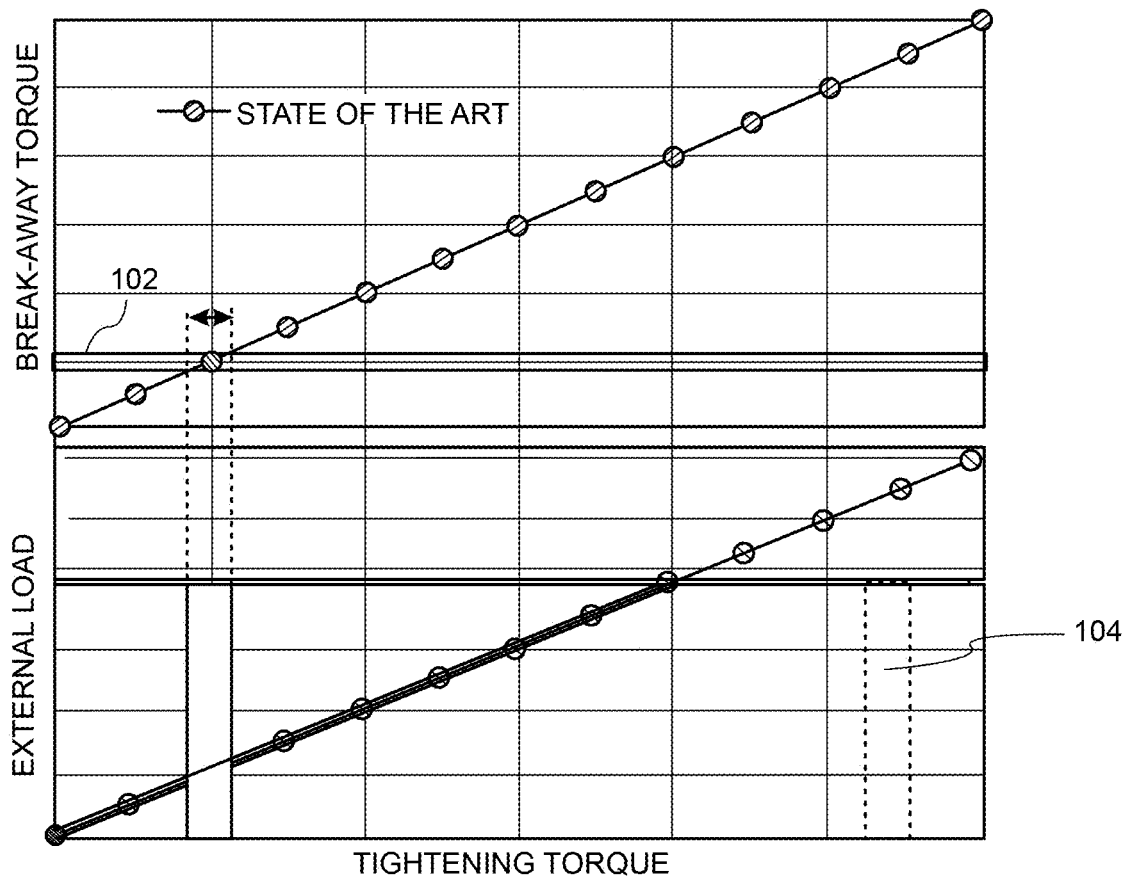
FIG. 3 shows a graph illustrating the conventional force relationships.
Figure 4:
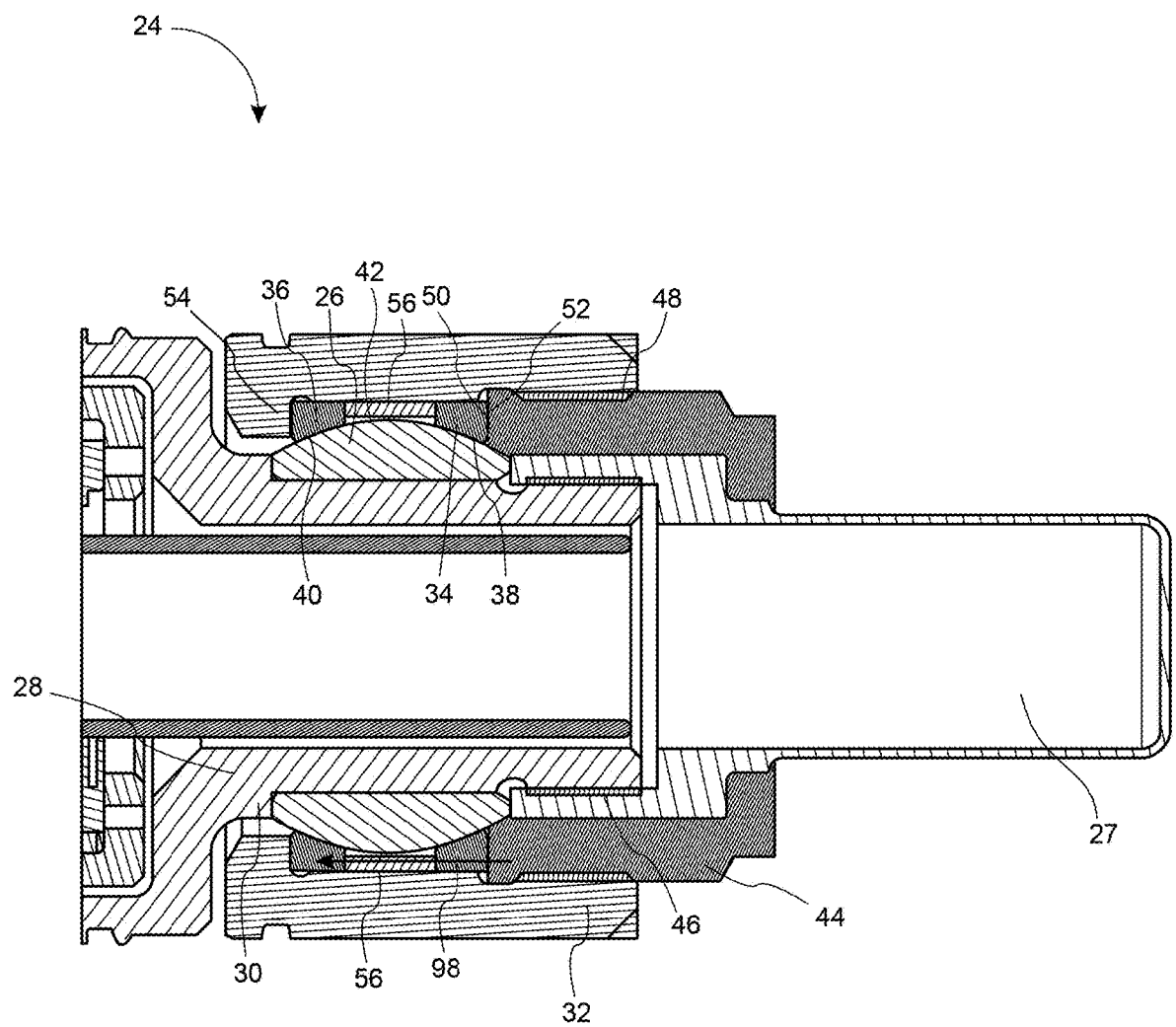
FIG. 4 shows a cross-section of a bearing assembly according to the disclosure.

FIG. 4 illustrates a bearing assembly 24 according to the present disclosure. This comprises all of the features of the arrangement of FIG. 2, with like reference numerals representing equivalent features. In addition, the bearing assembly 24 of FIG. 3 further comprises an annular shim 56 that is located between the two outer races 34, 36.

The size (and especially the width) of the shim 56 is selected so that, in operating conditions, it is able to contact both of the two outer races 34, 36 when these are also in contact with the spherical bearing 26.

When the outer nut 44 is tightened into contact with the right-hand outer race 34, the outer nut 44 exerts a force onto the right-hand outer race 34 in the same manner as described above in respect of FIG. 2, which pushes the right-hand outer race 34 to the left of FIG. 3. In contrast to the arrangement of FIG. 2, this pushes the right-hand outer race into contact with both the spherical bearing 26 and the shim 56.

In contrast to the arrangement shown in FIG. 2, therefore, the outer nut 44 is configured to tighten onto the housing 32, and in doing so will apply a load through a path including the right-hand outer race 34, the shim 56, the left-hand outer race 36 and onto the static housing 32. This is shown by the arrow 98 in FIG. 4. A force will still be exerted to cause the outer races 34, 36 to slidingly contact the spherical bearing 26, but the use of an additional load path (arrow 98) provides the technical effects set out herein.

Accordingly, by including the shim 56 between the two outer races 34, 36, a lower force is exerted by the outer nut 44 onto the spherical bearing 26 via the outer races 34, 36.

Figure 5:
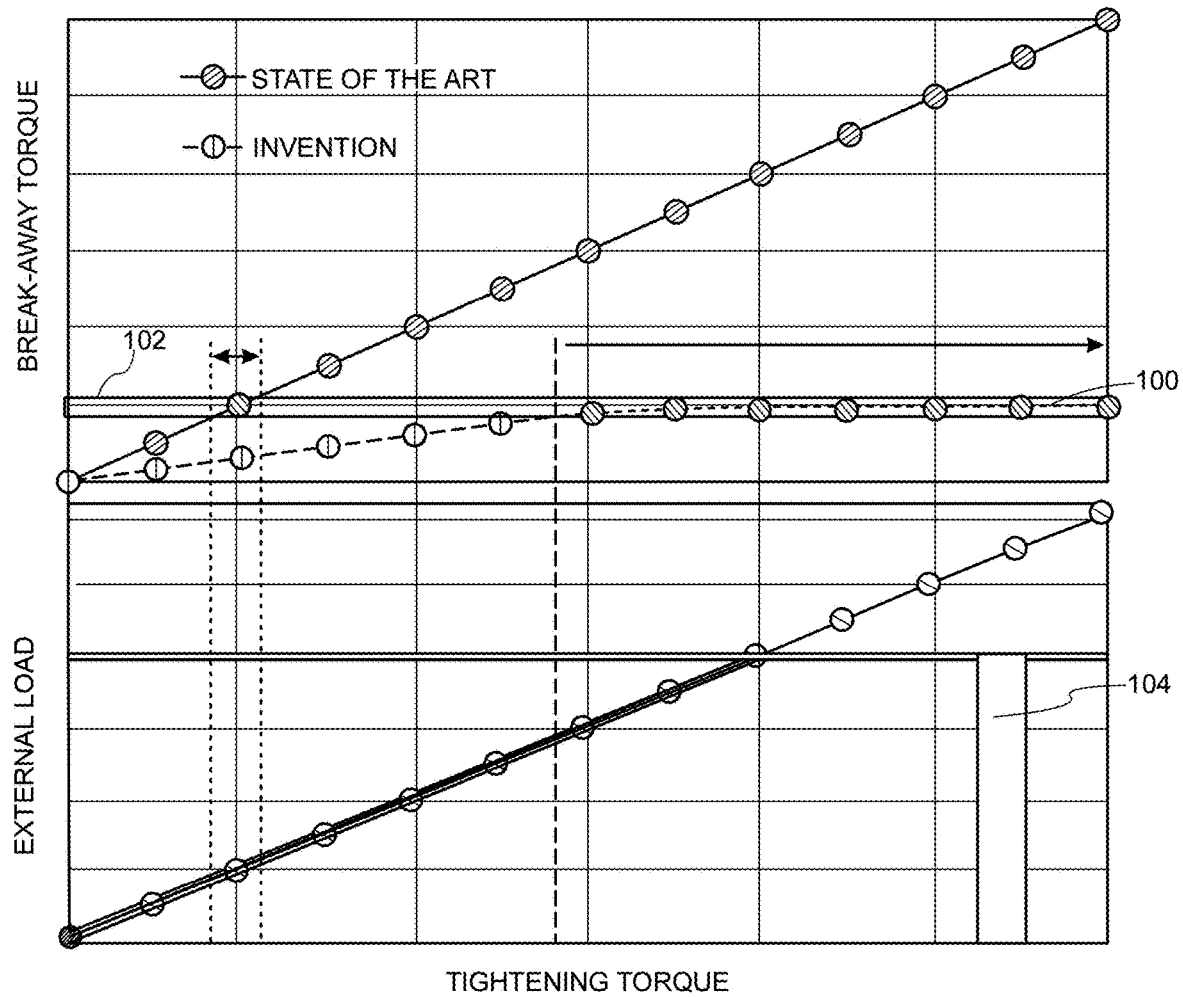
FIG. 5 shows a graph illustrating the force relationships of the present disclosure.

FIG. 5 shows two graphs similar to those of FIG. 3, but illustrating the difference caused by the shim 56 and the effect this has on the various torques. As shown in the top graph in FIG. 5, in the embodiment with the shim 56, the break-away torque of the spherical bearing 26 has an upper limit 106 (since the shim 56 cannot be compressed). There is, therefore, less dependence on the tightening torque of the outer nut 44. This essentially means that the user can apply a much larger tightening torque, since the break-away torque will not exceed the required upper limit of the range 102.

This is illustrated in the top graph in FIG. 5, wherein the tightening torque can be increased to the optimum range 104 whilst keeping the break-away torque of the spherical bearing within the required range 102. This results in higher stability of the break-away torque, and which is less dependent on the tightening torque (due to the use of the shim 56). As a result, it is possible to adapt the tightening torque according to requirements other than the break-away torque, such as the duty cycle of the actuator or external loads. This results in a bearing assembly 24 that requires less (or no) maintenance. The presence of an adequate tightening torque of the outer nut 44 also reduces the need for liners (for example polymeric liners) to be placed between the bearing and outer races. In operation, such liners tend to increase clearance between the parts due to wear. This is not acceptable for helicopters in particular because of their susceptibility to ground resonance. The removal of liners in the present disclosure results in a bearing arrangement which will have zero clearance thanks to the presence of adequate tightening torque to the outer nut 44.

The invention claimed is:

1. A linear actuator for a helicopter rotor, the linear actuator comprising:
    a bearing assembly comprising:
    a housing;
    a spherical bearing located within the housing;
    two outer races positioned between the spherical bearing and the housing, wherein the outer races are configured in sliding engagement with the spherical bearing to allow the spherical bearing to rotate relative to the housing; and
    a tightening element configured to engage a first of the two outer races and tighten the outer races against the spherical bearing, wherein the assembly is configured to provide a primary load path from the tightening element to the housing, wherein the primary load path leads from the tightening element to the housing via the outer races whilst bypassing the spherical bearing,
    wherein the bearing assembly comprises a shim between the first and second outer races, and the primary load path leads through the shim,
    wherein the linear actuator further comprises a shaft that extends through and is configured to move with the spherical bearing;
    wherein a first portion of the spherical bearing is configured to be in sliding engagement with a first of the two outer races, a second portion of the spherical bearing is configured to be in sliding engagement with a second of the two outer races, and the spherical bearing has a third portion between the first and second portions, the third portion of the spherical bearing having a curved cross-sectional profile such that a cross-sectional profile of the first, second and third portions of the spherical bearing follows a continuous curve with a constant radius of curvature.

2. The linear actuator of claim 1, wherein the shim contacts the first and second outer races to transfer load therebetween.

3. The linear actuator of claim 1, wherein the first and second outer races and the shim are positioned concentrically between the spherical bearing and the housing.

4. The linear actuator of claim 1, wherein the tightening element is configured to tighten so as to press the first outer race against the shim, which in turn presses the second outer race against a portion of the housing so as to provide the primary load path.

5. The linear actuator of claim 1, wherein the shim is an annular piece.

6. The linear actuator of claim 1, wherein the tightening element is configured to tighten the outer races against the spherical bearing to provide a preload of the bearing assembly.

7. The linear actuator of claim 1, wherein the tightening element is a screw.

8. The linear actuator of claim 1, wherein the housing comprises a surface, optionally a shoulder, against which the second outer race is configured to abut in use.

9. The linear actuator of claim 1, wherein the housing comprises an inner cylindrical bore with a screw thread which engages with a screw thread of the tightening element.

10. The linear actuator of claim 1, wherein the two outer races have curved inner surfaces which complement an outer surface of the spherical bearing to permit a continuous sliding contact therebetween.

* * * * *